United States Patent [19]

Johnson et al.

[11] Patent Number: 5,561,483

[45] Date of Patent: Oct. 1, 1996

[54] METHOD AND APPARATUS FOR PROVIDING AND CLEANING A FILM SUPPORT SURFACE

[76] Inventors: Neil A. Johnson, 6 Acorn, Portola Valley, Calif. 94028; Cy Miller, 33791 Remington Dr., Union City, Calif. 94587-3243

[21] Appl. No.: 470,146

[22] Filed: Jun. 6, 1995

Related U.S. Application Data

[63] Continuation-in-part of Ser. No. 397,868, Mar. 2, 1995, abandoned.

[51] Int. Cl.⁶ .............................. G03B 1/00; A47L 1/06
[52] U.S. Cl. ............................ 352/184; 352/130; 15/214
[58] Field of Search .................................. 352/130, 184; 15/214, 100

[56] References Cited

U.S. PATENT DOCUMENTS

| | | | |
|---|---|---|---|
| 3,914,035 | 10/1975 | Satterfield | 352/191 |
| 4,114,996 | 9/1978 | Shaw | 352/184 |
| 4,365,877 | 12/1982 | Shaw | 352/184 |
| 4,441,796 | 4/1984 | Shaw | 352/184 |

OTHER PUBLICATIONS

Article: "Particle Transfer Technology and Hardware", FPC (a Kodak Company), CA. no date.

*Primary Examiner*—Michael L. Gellner
*Assistant Examiner*—Matthew Miller
*Attorney, Agent, or Firm*—Burns, Doane, Swecker & Mathis

[57] ABSTRACT

In a rolling loop motion picture apparatus, such as a projector or camera, the movie film is pressed against a film supporting surface disposed within a light path. In order to be cleaned, the film supporting surface is moved out of the light path to an inoperative position opposite a sheet of material formed of an inert polyurethane material to which particulate contaminants adhere. The sheet is moved into contact with the film supporting surface, whereby the particulate contaminants adhere to the sheet. Then the sheet is retracted from the film supporting surface, along with the particulate contaminants. The film is guided between fixed and movable guide surfaces. The movable guide surface is spring-biased downwardly against the top edge of the film and is constrained against horizontal movement.

9 Claims, 5 Drawing Sheets

METHOD AND APPARATUS FOR PROVIDING AND CLEANING A FILM SUPPORT SURFACE

RELATED INVENTION

This is a Continuation-in-Part of our earlier application Ser. No. 08/397,868, filed Mar. 2, 1995 and now abandoned.

BACKGROUND OF THE INVENTION

The present invention relates generally to a rolling loop type of large screen motion picture projector such as has been described in U.S. Pat. Nos. 4,114,996 and 4,365,877 and in particular to a film support surface for such a projecter and to the cleaning of the support surface. There are two principal objects of this invention; first to assure that each frame of the film is properly positioned, in a stable and secure manner, relative to the projection lens focal plane, and second, to assure that the film and lens are free from particles of dust, dirt, hair and other contaminants which would be distracting to the audience, especially when seen on the screen magnified several hundred times.

A rolling loop type of large screen motion picture projector is conventional, e.g., see U.S. Pat. Nos. 4,114,996 and 4,365,877. Film enters such a projector through a film inlet guide where a portion of the film which is exactly one film frame in length is formed into a loop. Between the point on the inlet guide where the loop is formed and the aperture where the film frame is projected onto the screen is a distance of approximately five film frames in the film inlet guide. Hence, at any time during projection, the film inlet guide contains five stationary frames of film, registered to the aperture, and one frame of film in the loop which is moving in a circular path toward the aperture. The movement of the loop over the film in this path is very similar to that of a single wave moving over the surface of water. As the loop moves along the film path, the film frame which is in the loop replaces the film frame in the stationary film path that is just passed over. As the loop passes over the aperture, the next frame to appear in the aperture (on the screen) is the frame that had just previously been the one which was in the loop. Thus, the picture changed from one frame to the next one in proper sequence without moving the film or sliding on the inlet guide.

For structural reasons, as well as other reasons to be explained later, the film inlet guide is curved. Therefore, the loop and the film must follow a similarly curved path to enter and to exit the aperture. To accommodate this requirement, a circular motion is imparted to the loop by a component called a rotor which rotates through a radius of curvature and around an axis of rotation which coincides exactly with the axis and radius of curvature of the film guide. Furthermore, the film frame in the aperture must follow the same curvature and center of curvature that it followed when it was in the guide. For this reason, the rearmost element of the projection lens is made to the same radius and center of curvature as the film inlet guide. The surface just designated is caused to become the primary focal plane by designing the projection lens so that its focal plane is this surface. The film then is held in optical contact with this surface, thereby assuring that the film is held securely in the proper plane and that its geometric shape is properly curved. This element of the projection lens is also proportioned appropriately so that it provides the horizontal boundaries on both sides of the framing aperture. This element constitutes the focal plane and aperture of the entire optical system and although being transparent is very sharply focused on the screen. Any dust, dirt, hair or other contaminating materials present thereon would appear on the screen magnified several hundred times. The large nondescript black blobs thus produced would be very unpleasant and distracting to the viewing audience.

As the film moves into and through the projector, particles of contamination such as dust, dirt, hair, etc., carried thereby will be deposited on the lens/film support surface. The film has been previously cleaned by other means before entering the film guide, but after the loop is formed it picks up additional contamination. This is because the projector requires the use of a large film format containing very large frames (individual picture areas) several times larger than those in more common usage. When this film is projected at the standard rate of 24 frames per second, it is moving through the air at a much higher speed that the more common, smaller films at the same frame rate and it therefore builds up a significantly higher intensity of electrostatic charge. For this reason, particles of dust, dirt, hair, etc., are attracted to, and adhere to the film. Although, as mentioned before, the particles are removed by other means before the film enters the inlet guide, additional contamination can occur after the loop is formed but before arriving at the aperture. Then when a film frame is in the aperture, as previously stated, it is stationary and it is in optical contact with its support surface which is the rear surface of the rear element of the projection lens. During the short period of time that each frame is in this position of optical contact with the lens/support surface, it can deposit thereon a small amount of contamination, so that after a period of about 15 minutes, the contamination becomes excessive and very noticeable on the screen and must be removed. The running time of most motion pictures is substantially greater than 15 minutes and it is therefore necessary to clean the lens surface at regular intervals such as may be required during the presentation of a film without stopping the show. One object of the present invention is to provide such a cleaning action which is effective and longer lasting.

The rear surface of the rearmost element of the projection lens is actually one of a group of four surfaces (a group of two lens elements) which together have the main function of supporting the film in a manner optically modifying the curved shape of the film in the aperture so that it appears flat on the flat screen.

It is common, in optical parlance, to euphemistically refer to this function as a field flattener: and hereafter, this group of two lens elements together will be referred to as a field flattener even though it performs other important functions not implied by that title. As stated previously, there are two lens elements in the field flattener group, but there are also two field flattener groups and each of these groups can function interchangeably as rear elements of the common projection lens so that one field flattener can be substituted for the other while a show is being presented and the difference would not be discernible.

The field flattener elements are actually cylindrical lenses having the general shape of a cylindrical segment standing on end with its cylindrical axis in a vertical direction. In lenses of this type, the optical power is entirely along the horizontal axis; that is to say, there is no power at all in the vertical axis. Hence, the elements can be moved in a direction parallel to the vertical cylindrical axis, without producing a discernible shift or displacement of the projected image. The field flatteners are therefore mounted in a carrier module, which is capable of moving up and down in a vertical direction, and they are arranged in such a way that when one is centered in the aperture and aligned with the projection lens and supporting the film frame which is in the aperture, the other is above or below the aperture and is therefore not visible on the screen.

During a projecting operation, there may tend to occur a condition commonly referred to as "jump" wherein the film in the aperture undergoes a slight vertical movement. When this occurs, a corresponding, but greatly magnified, vertical movement of the projected image appears on the screen, which is unpleasant for the audience. It is desirable to minimize that condition.

SUMMARY OF THE INVENTION

In the present invention, a cleaning device removes any contamination that may be present on an optical or any other surface in such a manner that there is no wiping action between the device and the surface being cleaned. The cleaning action takes place entirely through contact with the cleaning device. The cleaning device is brought into contact with a contaminated surface and the contaminants adhere to the device so that when the device is removed from the surface, the contaminants are carried away with it and the surface is left clean and unblemished without contamination. Also, the cleaning device can remain on the optical surface until the surface is to be re-used, thereby preventing recontamination.

The invention also provides lateral (vertical) guidance of the film in the aperture as it is being projected. This is accomplished by a pressure pad or pressure bar which functions by applying a force in a downward direction against the upper edge of the film to hold it down against lower edge guide and prevent vertical movement of the film regardless of changes in the width of the film. It is unique in the sense that it exerts only a downward force on the film to prevent slight vertical movement of the film, that is, the force is unidirectional and contains no other components which produce film displacement in any direction other than downward against the lower edge guide. Thus, the true geometric shape of the film as defined by the film support surface, is not disturbed.

BRIEF DESCRIPTION OF THE DRAWINGS

The objects and advantages of the invention will become apparent from the following detailed description of preferred embodiments thereof in connection with the accompanying drawings in which like numerals designate like elements and in which.

DETAILED DESCRIPTION OF PREFERRED EMBODIMENTS OF THE INVENTION

Figure 1:
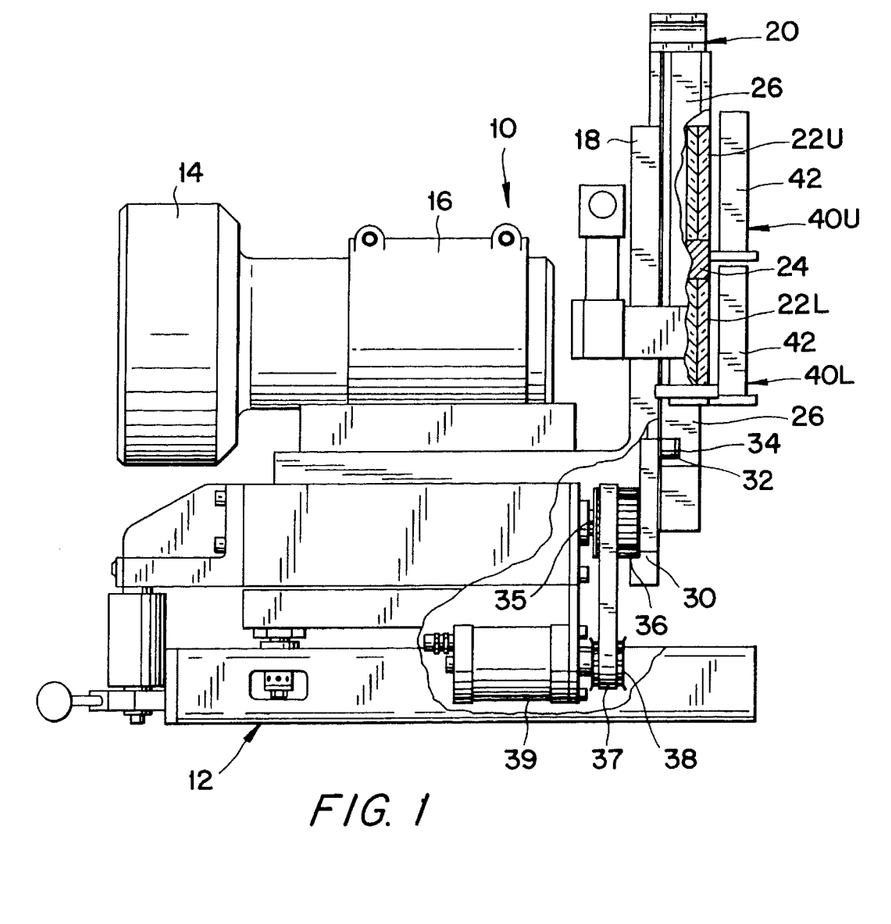
FIG. 1 is a left side elevational view, partially broken away, of the present rolling loop motion picture projector containing a first embodiment of a cleaning mechanism according to the present invention.
Figure 2:
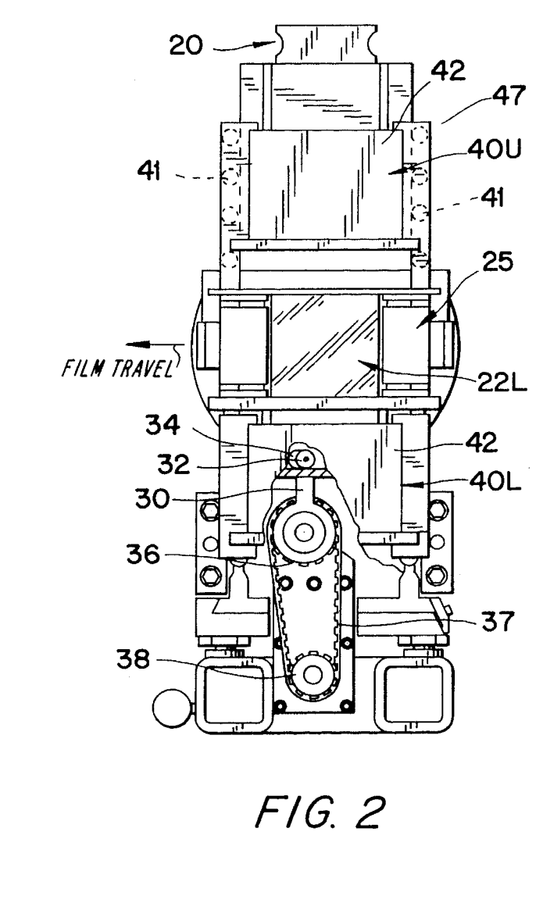
FIG. 2 is a rear elevational view, partially broken away, of the projector depicted in FIG. 1.
Figure 8:
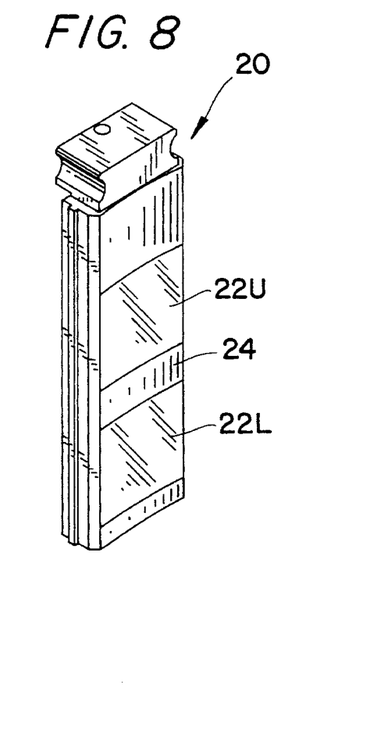
FIG. 8 is a perspective view of a field flattener module.

Depicted in FIGS. 1 and 2 is the optics head of a rolling loop motion picture projector 10 mounted on a base 12 on which a main lens 14 is mounted by means of a mounting clamp 16. Mounted behind the main lens 14 is a fixed guide 18 in which there is mounted a vertically slidable film support module 20 (see also FIG. 8). That module 20 includes upper and lower film support (or field flattening) surfaces 22U, 22L separated by an opaque band 24.

The module 20 is mounted in a carrier 26 to which is connected a cranking device 30 having upper and lower ends. The upper end carries a roller 32 seated in a horizontal slot 34 formed in the carrier 26 (see FIG. 2). The lower end of the crank is affixed to an upper gear 36 which is mounted to a horizontal axle 35. That gear 36 is rotated by a timing belt 37 connected to a drive gear 38 which is driven by a rotary actuator 39. When the rotary actuator is driven, the upper gear 36 and shift lever are simultaneously rotated about the axis of the axle 35. As a result, the roller 32 moves up or down (while moving horizontally within the slot 34) to produce vertical movement of the carrier 26 and module 20 relative to an aperture assembly 25 in which an aperture is disposed in alignment with the main lens 14. In so doing, one of the film support surfaces 22U, 22L is moved out of an aperture (operating) position aligned with the main lens 14 and into a cleaning position, while the other film support surface is simultaneously moved into the aperture position from its cleaning position. A reverse procedure occurs when the actuator 39 drives the belt 37 in the opposite direction. The module is guided for movement by vertically spaced guide rollers 41 which are located along the sides of the module and which rotate about horizontal axes to minimize friction and wear of the module.

Figure 11A:
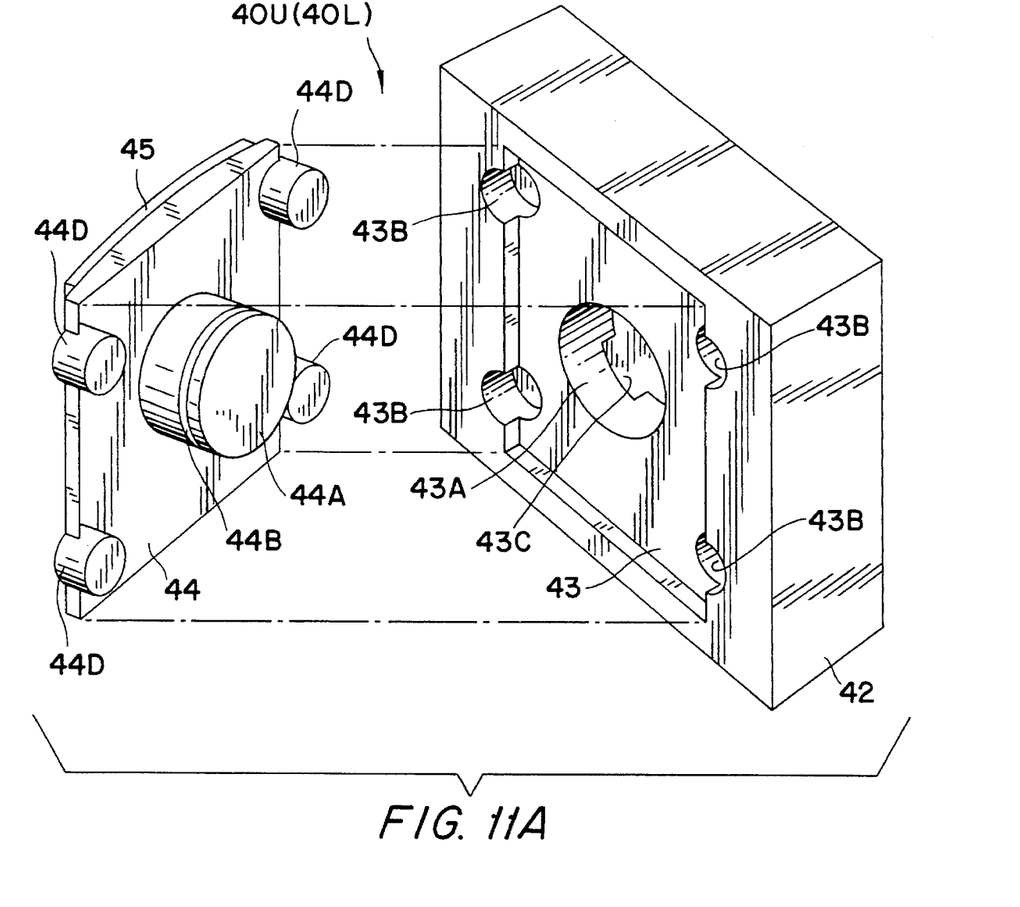
FIG. 11A is an exploded perspective view of a first embodiment of the cleaning unit.
Figure 11B:
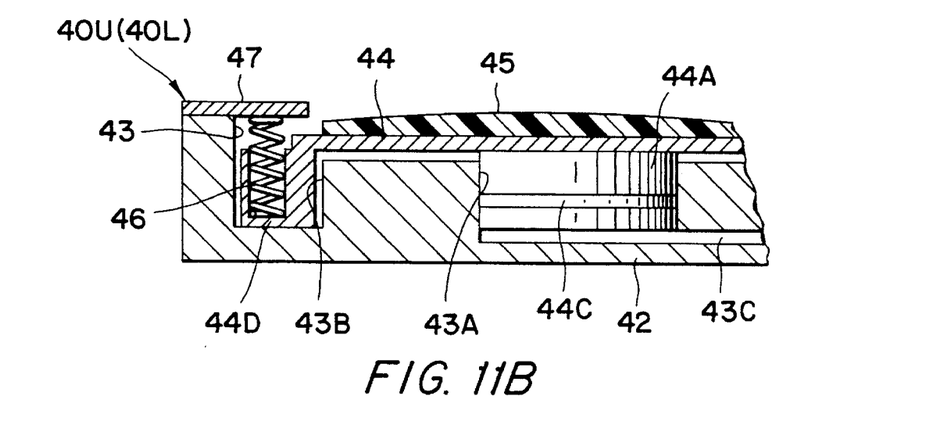
FIG. 11B is a partial horizontal sectional view taken through the center of the cleaning unit of FIG. 11A.

Mounted on the aperture front side of the guide 18 is a cleaning mechanism for cleaning the film support surfaces 22U, 22L. That cleaning mechanism comprises upper and lower cleaning units 40U, 40L. As shown in FIGS. 11A, 11B each cleaning unit comprises a rectangular base plate 42 that includes a rectangular recess 43 in which are disposed a central cylindrical recess 43A and four smaller cylindrical recesses 43B located adjacent respective corners of the rectangular recess 43. A passage 43C communicates with a rear end of the central recess 43A and is connected to a source of pneumatic pressure for actuating a pneumatic piston, as will be explained below.

Mounted in the base plate 42 for reciprocation along the longitudinal axis of the central recess 43A is a driver plate 44 having an integral cylindrical piston 44A slidably disposed in the central recess 43A. The piston includes an annular groove 44B (FIG. 11A) for carrying an annular piston ring 44C (FIG. 11B) which forms a seal with a wall of the central recess 43A. Affixed to a front side of the base plate 42 is a sheet 45 of a material having an affinity for dirt, dust, hair, etc. Such a material preferably comprises a flexible, inert polyurethane material available, for example, from FPC, 6777 Santa Monica Boulevard, P.O. Box 38995, Hollywood, Calif. 90038 (a subsidiary of Kodak). Heretofore, that material has been available in belt or roller form for picking up dirt, dust, hair, etc., from film, video tape and other smooth continuous web surfaces.

The sheet material 45 is sufficiently soft to conform to the contour of the field flattener surface 22U or 22L. When the sheet 45 makes contact with the film support surface with a blotting action as shown in the upper portion of FIG. 4, dust, dirt, hair and other particulate contaminants will adhere to the sheet and be drawn away form the film support surface when the sheet is retracted.

The sheet is reusable and can be periodically cleaned with soapy water to remove the adhered materials. Since the blotting, action eliminates any wiping, i.e., a rubbing of the cleaner across the supporting surface as could occur with fixed wipers or rollers, there is little risk of the supporting surface being scratched or otherwise married by abrasive contaminants.

Extension of the sheet material 45 toward and against the film support surface is effected by introducing pneumatic pressure behind the piston 44A through the passage 43C. Retraction of the sheet material 45 is effected by coil compression springs 46 mounted in cup-shaped portions 44D of the drives plate. Those cup-shaped portions 44D are slidably mounted in respective ones of the cylindrical recesses 43B.

Attached to the base plate 42 in overlying relationship to outer ends of the springs 46 are retainer plates 47 (shown in FIG. 11B but not in FIG. 11A. It will be appreciated that when the piston 44A is extended toward the film support surface, the springs 46 become compressed, so that when the pneumatic pressure behind the piston is relieved, the springs retract the driver plate 44 and sheet. 45 back into the recess 43.

Although the pneumatic cylinder/piston 43A, 44A is disclosed as being single acting, it could instead be double acting, whereupon the need for springs 46 would be obviated.

It will be appreciated that the upper and lower cleaning mechanisms 40U, 40L are alternately employed. That is, when the upper film support surface 22U is in its cleaning position being cleaned, the lower film support surface 22L in an aperture position and aligned with the main lens 14, and vice-versa.

An alternative cleaning system is in the form of upper and lower cleaning mechanisms 50U, 50L depicted in FIGS. 5–7, 9 and 10. Each of those cleaning mechanisms comprises a rectangular manifold 52 (see FIG. 9) which defines a network of air channels. That air channel network includes a plurality of vertical, parallel air channels 58 (only one channel depicted in FIG. 9) which are interconnected by a horizontal infeed channel 60. That infeed channel extends through a side of the manifold and terminates at a horizontal projecting tube 62 (see FIG. 6). Projecting from each vertical channel 58 is a plurality of vertically spaced horizontal channels 64 which open at a side of the manifold facing the main lens 14. Affixed to that side of the manifold is a rectangular flexible sheet in the form of a bladder 65 which is adapted to be extended toward, or retracted away from, a field flattener surface, depending upon the pressure conditions existing in the channel network 56.

Figure 9:
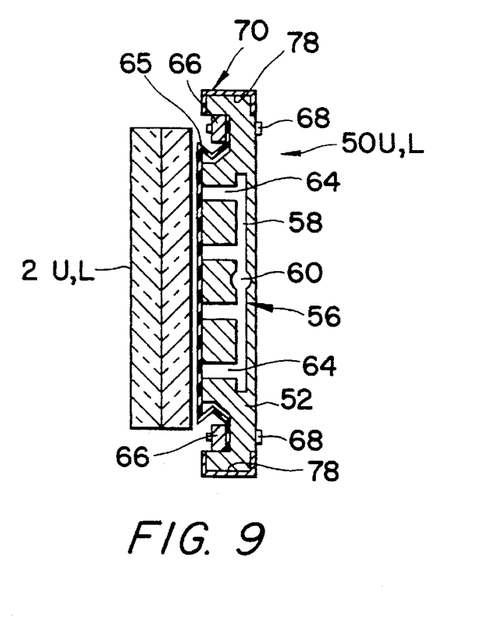
FIG. 9 is an enlarged, sectional view of a cleaning unit depicted in FIG. 7 with a cleaning bladder disposed in a retracted condition.

The bladder is connected to the manifold by means of four bars 66 (two of the bars, arranged horizontally, are shown in FIG. 9) which bear against four outer edge regions of the bladder. Bolts 68 extend through the manifold, bladder and bars 66 to pull the bars firmly toward the manifold with the bladder sandwiched there between, to secure the bladder to the manifold while creating an air-tight seal around the bladder periphery. Accordingly, a positive air pressure in the channels 64 will expand the bladder toward a field flattening surface 22U or 22L disposed adjacent thereto, and a negative pressure within the channels 64 will retract the bladder away from the field flattening surface. The bladder 65 is formed of the same material as the above-described sheet 45, and can be periodically cleaned.

Figure 5:
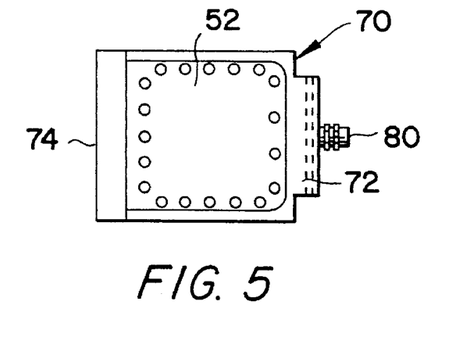
FIG. 5 is a rear elevational view of a second embodiment of a cleaning unit according to the present invention.
Figure 6:
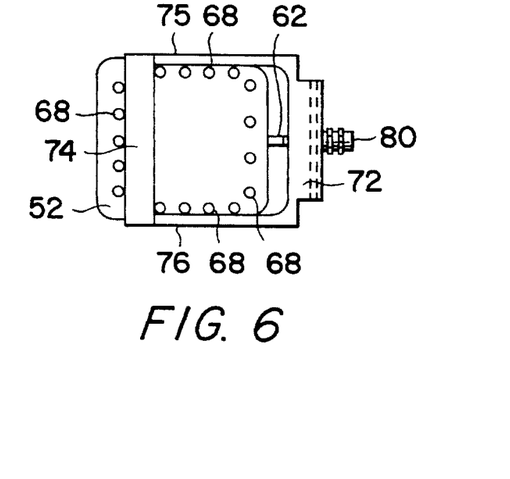
FIG. 6 is a view similar to FIG. 5 with the cleaning mechanism thereof in a partially disassembled state.

The manifold 52 is removably mounted in a hinged holder 70 which comprises a pair of vertically spaced horizontal top and bottom portions 75, 76 interconnected by vertical portions 72, 74 (see FIGS. 5 and 6). Each horizontal portion 75, 76 is generally of U-shape to form a guide groove 78 (see FIG. 9). The manifold can be slid into and from the guide grooves 78 (see FIG. 6 showing the manifold disposed partially out of the holder). When sliding the manifold into the holder, the tube 62 is brought into communication with an air fitting 80. The holder 70 is attached to the frame 12 by vertical hinge pins 82 which extend through the vertical end portion 72. In order to remove and clean the bladder 65, as will be explained, the holder is swung out of position about the vertical hinge pins 82.

Figure 10:
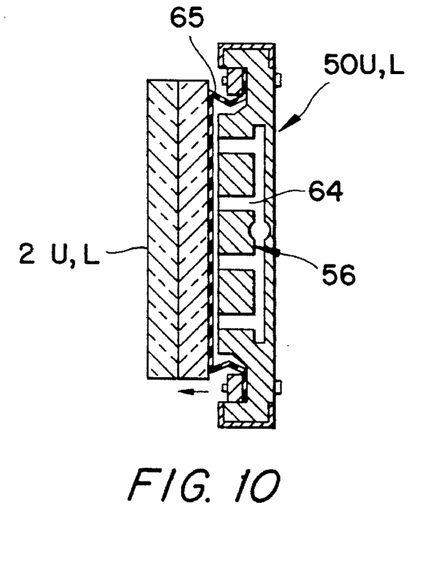
FIG. 10 is a view similar to FIG. 9 with the cleaning bladder disposed in an extended condition.

The bladder material is sufficiently flexible to be flexed toward and away from a film support surface and to conform to the shape thereof. When the bladder 65 makes contact with the film support surface as shown in FIG. 10, dust, dirt, hair and other particulate contaminants will adhere to the bladder and be drawn away from the film support surface when the bladder is retracted, i.e, when the positive pressure is relieved or, more preferably, when a vacuum is produced in the channel network 64 (see FIG. 7). That is, while it would be possible to rely upon the inherent flexibility of the bladder to shift away from the support surface, it is preferable to assist that movement by the application of a vacuum.

The positive and negative air pressures are produced by conventional compressor equipment (not shown) connected to the air fittings 80 of the cleaning units 50U, 50L by hoses.

It will be appreciated that since the bladder 65 is anchored along its outer perimeter, it will exhibit the greatest flexibility at its center, whereby the rate of expansion of the bladder will be most rapid at the center and progressively less rapid toward its fixed outer periphery. Consequently, contact between the bladder and film support surface initiates at the center of the bladder and progresses outwardly toward the outer edge. In that fashion, air will become pushed out from between the bladder and film support surface rather than becoming trapped there between, thereby ensuring that the bladder will properly contact the film support surface.

Figure 3:
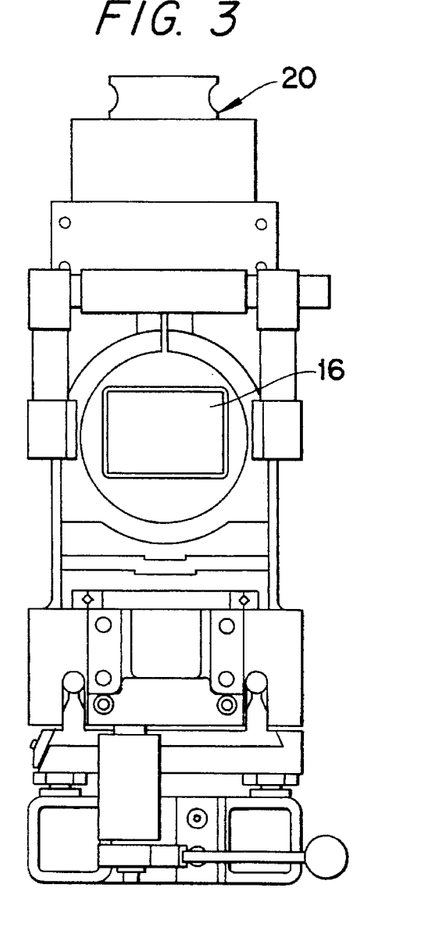
FIG. 3 is a front elevational view of the projector depicted in FIG. 1.
Figure 4:
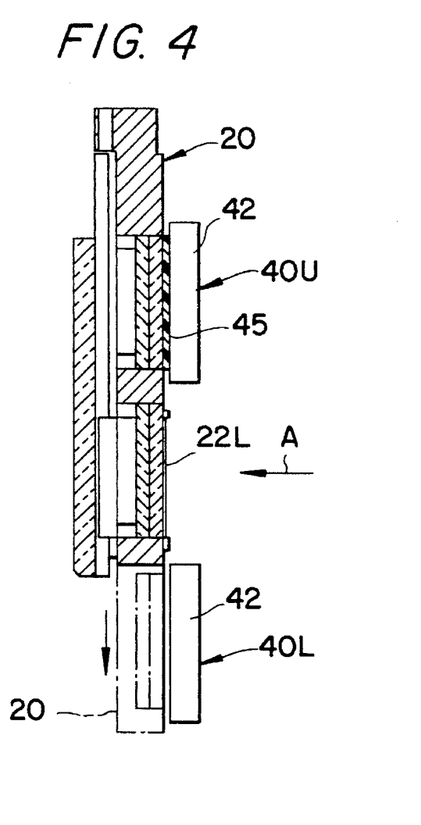
FIG. 4 is a vertical sectional view taken through a film support module and a first embodiment of a cleaning mechanism according to the present invention, with the solid lines showing the module in a position for locating a lower film support surface thereof in an operational position, and in the broken line position thereof the lower film support surface is disposed in a cleaning (non-operational) position.
Figure 7:
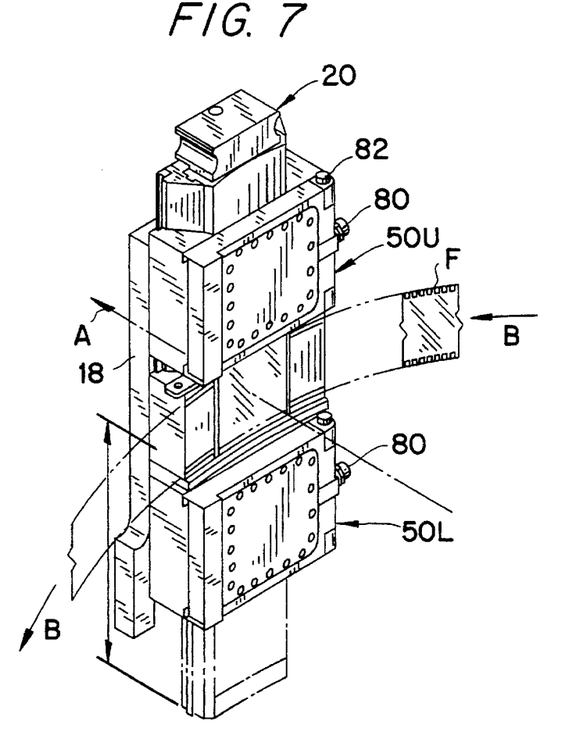
FIG. 7 is a schematic perspective view of a film guide portion of the projector employing the second cleaning unit embodiment.

In operation, during the projection of a film onto a screen, light passes through the projection lens in the direction of arrow A in FIG. 4, while the film is moved in the direction of arrow B (FIG. 3). The module 20 is situated such that one of the film support surfaces 22U lies in the path of the light, i.e., in the aperture position, while the other film support surface is in its cleaning position. In FIGS. 4 and 7 is disposed in the lower film support surface 22L in the light path. The upper film support surface is thus engaged by the sheet 45 of the upper cleaning mechanism 40U (FIG. 4), or by the bladder 65 of the cleaning unit 50U (FIG. 7). The sheet 45 is extended toward the film support surface by the cylinder 43, whereas the bladder 65 is held in an expanded state by positive pressurization of the air channel network 56.

When the support surface again needs cleaning, the rotary actuator 44 is actuated to rotate the crank 30 clockwise (with reference to FIG. 2), whereby the module 20 is shifted downwardly. Simultaneously, the cleaning sheet 45 (or the bladder 65) is retracted away from the upper film support surface. The sheet 45 is retracted by the cylinder 43 or springs 46. To retract the bladder 65, suitable valving is actuated to place the air channel network 56 of the upper manifold 52 in communication with a vacuum in order to pull the bladder 65 away from the upper film support surface 22U. The retraction of the cleaning sheet or bladder also removes any contaminants previously contained on the upper film support surface.

As a result of the downward shifting of the module, the upper film support surface 22U becomes positioned in the light path, and the lower film support surface 22L becomes positioned opposite the sheet 45 (or bladder 65) of the lower cleaning mechanism. Then, the lower cleaning mechanism 40L (or 50L) is operated in the same way as the upper cleaning mechanism to clean the lower film support surface 22L. It will be appreciated that the cleaning sheet or bladder makes complete contact with the film support surface so that all contaminants on that surface, such as dust, dirt, hair, etc. become adhered to the bladder. It will be appreciated that the sheet or bladder engages the film support surface with a blotting-type action, i.e., a non-wiping action. Hence, there is no risk of the film support surface being scratched, or of moist contaminants, such as pollen, being smeared across the support surface.

For the remainder of the period that the upper film support surface 22U is situated within the light path, the sheet 45 (or bladder 65) of the lower cleaning unit is held in contact with the lower film support surface 22L to prevent that surface from being recontaminated. Eventually, the module 20 is shifted upwardly by actuation of the rotary actuator 44 to rotate the shift level 30 counter-clockwise (FIG. 2). Simultaneously, the sheet 45 (or bladder 65) is retracted away from the lower film support surface 22L along with any particulate contaminants adhered to the bladder.

The above-described cycle can be repeated as frequently as desired to ensure that the film support surfaces are cleaned often enough.

Figures 12, 13:
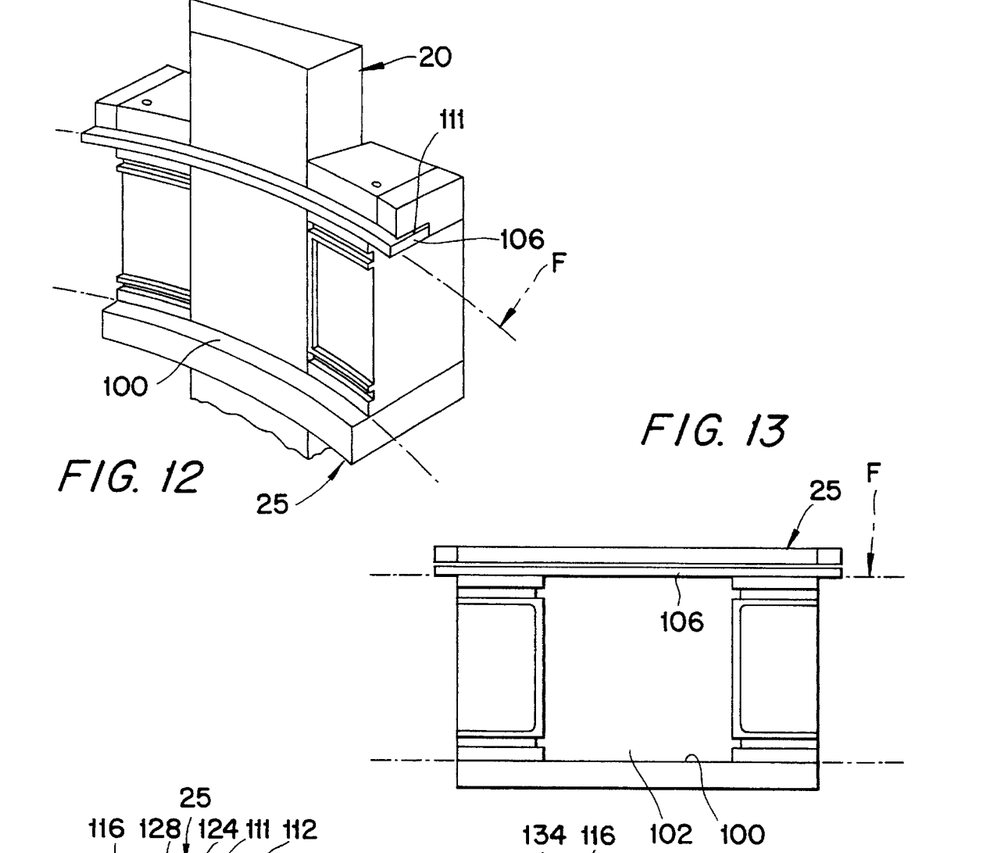
FIG. 12 is a perspective view of an aperture assembly possessing a pressure pad and film guide according to the present invention.
FIG. 13 is a front elevational view of the apparatus depicted in FIG. 12.
Figures 14, 15:
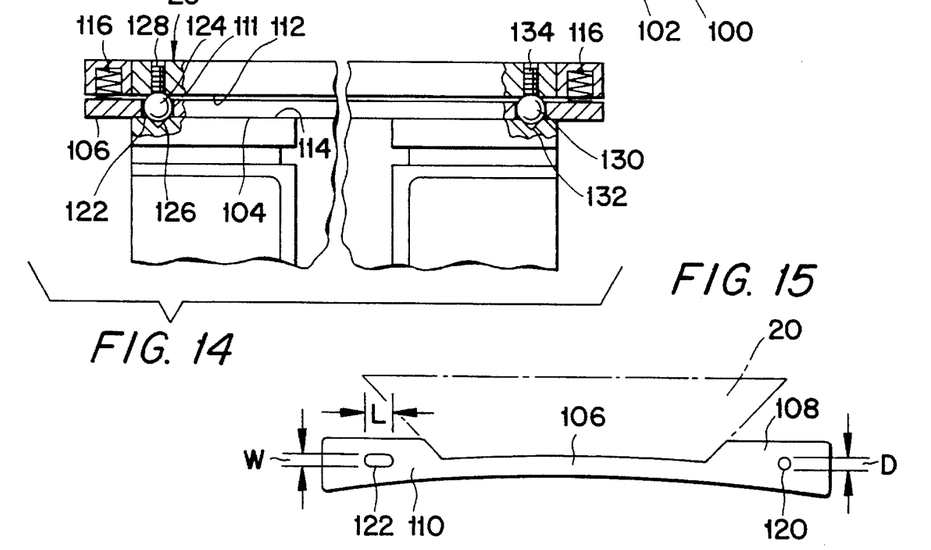
FIG. 14 is an enlarged fragmentary portion of the aperture assembly depicted in FIG. 13.
FIG. 15 is a top plan view of the pressure pad depicted in FIGS. 12–14.

Depicted in FIG. 12 is an enlarged view of the aperture assembly in which the module 20 is vertically movable. The aperture assembly is affixed to a fixed lower film guide surface 100 upon which the film F travels past the aperture 102 formed by the aperture assembly. A movable upper film guide surface 104 is formed by the underside of a pressure pad 106. The pressure pad includes a pair of enlarged mounting portions 108, 110 disposed in slots 111 formed between surfaces 112, 114 of the aperture assembly. The height of the slots is greater than the thickness of the pressure pad 106 so that the pad is vertically movable to a limited extent. Springs 116 disposed in the aperture assembly press the pressure pad downwardly against the surface 114.

The pressure pad 106 includes an aperture in the form of a cylindrical hole 120 at one end and an aperture in the form of a slot 122 at the other end. The slot receives a hardened steel ball 124 which sits in a beveled (conical) recess 126 formed in the surface 114. The ball 124 is pushed downwardly against the recess 126 by a screw 128 mounted in the aperture assembly. The width W of the slot is dimensioned to correspond to the ball diameter, and the length L of the slot is greater than the ball diameter.

The hole 120 receives a hardened steel ball 130 which sits in a beveled (conical) recess 132 formed in the surface 114. The ball 130 is pushed downwardly against the recess 132 by a screw 134 mounted in the aperture assembly. The diameter D of the cylindrical hole corresponds to the diameter of the ball 130.

Due to the presence of the balls 124, 130 in the slot 122 and hole 120, respectively, the pressure pad 106 cannot move horizontally in any direction relative to the aperture assembly 25. Rather, the pressure pad 106 can only move vertically, and that vertical movement is guided by the balls 124, 130.

In practice, the film F is guided between the upper and lower guide surfaces 100, 104 and is pushed downwardly against the lower guide surface 100 by the upper guide surface 104. That is, the springs 116 push the pressure pad 106 downwardly, and the surface 104 of the pressure pad pushes downwardly against the top edge of the film F. Thus, the film is guided at its top and bottom edges. The force of springs 116 is great enough to prevent the film from moving upwardly, thereby eliminating the "jump" problem described earlier herein. On the other hand, the flexibility of the spring accommodates films of different heights.

Since the pressure pad cannot move in any horizontal direction, it will resist movement of the film out of its intended travel path.

While theoretically it would have been possible to provide two cylindrical holes 120 instead of one hole and one slot 122 (i.e., to replace the slot 122 with a cylindrical hole 120), it would be very difficult to locate two holes 120 precisely with respect to the recesses 126 and 132. However, by providing a slot 122, the recess 126 need not be precisely located with respect to the slot 122.

Although the present invention has been described in connection with preferred embodiments thereof, it will be appreciated by those skilled in the art that additions, deletions, modifications, and substitutions not specifically described may be made without departing from the spirit and scope of the invention as defined in the appended claims.

What is claimed:

1. A film support mechanism for a rolling loop motion picture apparatus, comprising:

a housing;

a module mounted on the housing and including a film supporting surface, the module being movable for shifting the film supporting surface between an aperture position within a light path and a cleaning position spaced from the light path; and a cleaning unit situated adjacent the cleaning position and including a sheet of a flexible material to which particulate contaminants adhere, the sheet being of substantially the same size and shape as the film supporting surface and mounted on an actuating structure which moves the sheet toward or away from the film supporting surface for removing therefrom particulate contaminants with a blotting action in the absence of wiping, to avoid scratching the supporting surface.

2. The mechanism according to claim 1, wherein the film supporting surface constitutes a first film supporting surface, the module including a second film supporting surface arranged to be shifted between an aperture position within the light path, and a cleaning position spaced from the light path.

3. The mechanism according to claim 2, wherein the cleaning unit constitutes a first cleaning unit, and further including a second said cleaning unit, the first and second cleaning units positioned adjacent the aperture positions of the first and second film supporting surfaces.

4. The mechanism according to claim 1, wherein the sheet of flexible material is mounted on a base plate, the actuating structure comprising a reciprocation mechanism connected to the base plate for moving the sheet into contact with the film supporting surface.

5. The mechanism according to claim 4, wherein the actuating structure further includes springs for pushing the base plate and sheet away from the film supporting surface.

6. The mechanism according to claim 1, wherein the actuating structure includes a fluid manifold connected to a fluid pressurizing mechanism for applying a positive pressure to the sheet for expanding the sheet toward the film supporting surface.

7. The mechanism according to claim 1, wherein the actuating structure includes a fluid manifold connected to a fluid pressurizing mechanism for alternately applying positive and negative pressures to the sheet for moving the sheet respectively toward and away from the film supporting surface.

8. The mechanism according to claim 1, wherein the sheet is formed of an inert polyurethane material.

9. The mechanism according to claim 1, wherein each film supporting surface is concavely curved.

* * * * *